Figure 1:
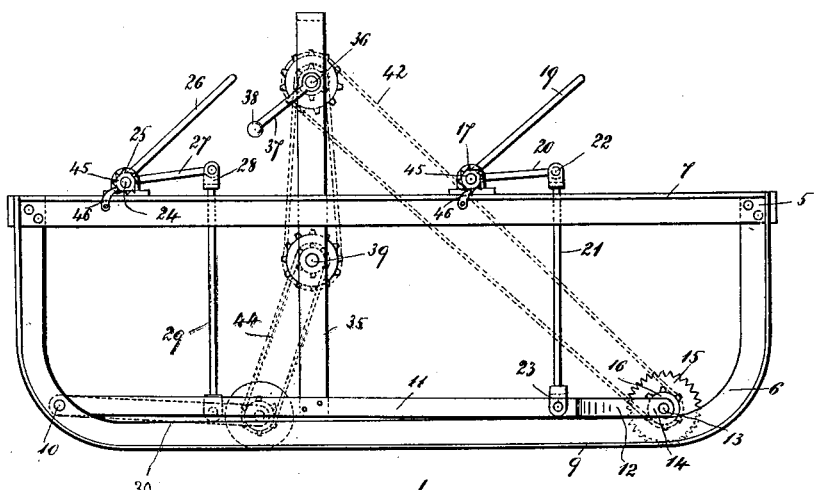

No. 656,186. Patented Aug. 21, 1900.
J. C. GREEN.
ICE CUTTING VEHICLE.
(Application filed Oct. 17, 1899.)
(No Model.) 2 Sheets—Sheet 1.

WITNESSES
John Kuckler
F. A. Stewart

INVENTOR
James C. Green,
BY
Edgar Tate
ATTORNEYS

No. 656,186. Patented Aug. 21, 1900.
J. C. GREEN.
ICE CUTTING VEHICLE.
(Application filed Oct. 17, 1899.)
(No Model.) 2 Sheets—Sheet 2.

WITNESSES
John Buckler,
F. U. Stewart

INVENTOR
James C. Green,
BY
Edgar Tate
ATTORNEYS.

UNITED STATES PATENT OFFICE.

JAMES C. GREEN, OF SERGEANTSVILLE, NEW JERSEY.

ICE-CUTTING VEHICLE.

SPECIFICATION forming part of Letters Patent No. 656,186, dated August 21, 1900.

Application filed October 17, 1899. Serial No. 733,872. (No model.)

*To all whom it may concern:*

Be it known that I, JAMES C. GREEN, a citizen of the United States, residing at Sergeantsville, in the county of Hunterdon and State of New Jersey, have invented certain new and useful Improvements in Ice-Cutting Vehicles, of which the following is a full and complete specification, such as will enable those skilled in the art to which it appertains to make and use the same.

This invention relates to ice-cutting vehicles, and has for its object, first, to provide a sled which may be propelled by the occupant and by means of which the ice may be speedily and efficiently cut through the instrumentality of implements forming part of the device and arranged to be operated by the occupant of the sled, and, second, to produce such a device as will be peculiarly simple in construction, facile of operation, strong and durable, and light enough to be readily moved from place to place.

My invention is fully disclosed in the following specification, of which the accompanying drawings form a part, in which like reference characters denote like parts in the several views, and in which—

Figure 2:
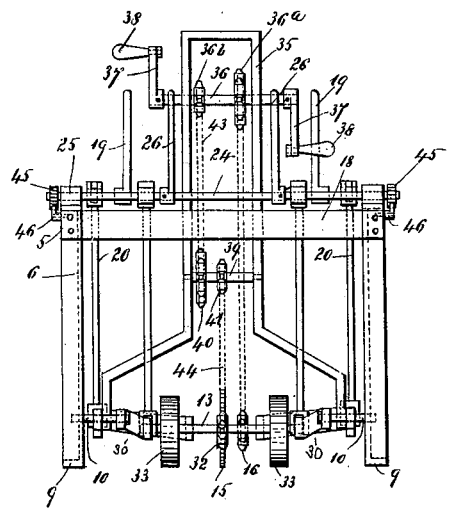
Figure 3:
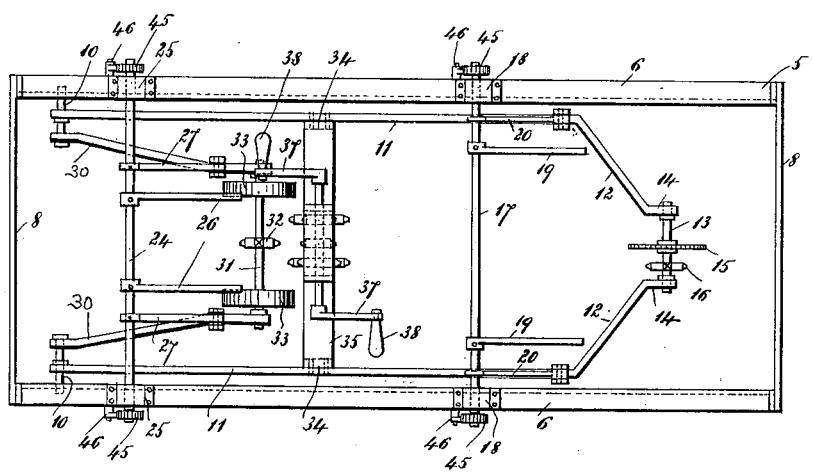

Figure 1 is a side elevation of an ice-cutting sled constructed according to my invention; Fig. 2, an end view thereof, and Fig. 3 a plan view thereof.

In the practice of my invention I construct a sled-frame 5, which consists of strips of angle-iron formed into side members 6, longitudinal upper members 7, and transverse upper members 8. The side members 6 are designed to rest upon the ice, the lower portions 9 thereof serving as runners. The frame 5 is provided at one end with a pair of stub-shafts 10, which are fixed oppositely in its sides 6, and pivotally connected with these shafts 10 are a pair of arms 11, provided at their outer ends with converging extensions 12, bent to form parallel directed flanges or bearings 14, in which is journaled a shaft 13, provided with a fixed cutter-wheel 15 and a fixed sprocket-wheel 16. The cutter-wheel 15 is provided with a toothed periphery, as shown in the drawings, similar to the periphery of a circular saw.

A shaft 17 is journaled transversely of the frame 5, as at 18, slightly at one side of the center of said frame, and is provided near each of its ends with operating arms or cranks 19 and with lever-arms 20, which are pivotally connected with the upper ends of connecting-rods 21, as at 22, and said connecting-rods 21 are pivotally connected at their lower ends, as at 23, with the longitudinally-arranged arms 11. Near the opposite end of the frame 5 a transverse shaft 24, similar to the shaft 17, is journaled, as at 25, said shaft 24 being provided with operating-arms 26 near either end and with lever-arms 27, which are pivotally connected, as at 28, with the upper ends of connecting-rods 29, which are pivotally connected at their lower ends with diverging arms 30, which latter are pivotally connected at their lower ends with the stub-shafts 10 and are provided at their outer ends with a shaft 31, journaled therein. The shaft 31 bears a fixed sprocket-wheel 32 centrally and a pair of fixed drive-wheels 33 at either end.

Connected with the arms 11 at either side of the frame 5, as at 34, is an upwardly-directed skeleton frame 35, through the upper portion of which is passed a transverse shaft 36, provided with sprocket-wheels $36^a$ and $36^b$, the ends of which shaft are provided with cranks 37, bearing handles 38. A supplemental shaft 39 is journaled in the frame 35 below the shaft 36 and is provided with two fixed sprocket-wheels 40 and 41. The sprocket-wheel $36^a$ upon the shaft 36 is geared in connection with the sprocket-wheel 16 upon the shaft 13 by means of a chain 42, and the sprocket-wheel $36^b$ on the shaft 36 is geared in connection with the sprocket-wheel 40 upon the shaft 39 by a chain 43. The sprocket-wheel 41 upon the shaft 39 is geared in connection with the sprocket-wheel 32 upon the shaft 31 by a chain 44.

It is evident that by operating the arms 19 the connecting-rods 21 will actuate the arms 11 to lower or raise the cutter-wheel 15, whereby it is thrown into engagement with the ice to be cut or withdrawn therefrom. Similarly if the arms 26 be operated the drive-wheels 33 may be thrown down to engage the ice or may be thrown up out of engagement therewith. The adjustment of the arms 11 will manifestly adjust the frame 35 and connected parts, keeping the chain-gearing of the several parts in properly-tautened condition. When the arms 19 and 26 are depressed and the drive-wheels 33 and cutter-wheel 15 are in engagement with the ice, if the cranks 38 be manipulated the vehicle above described will be propelled along the ice by the drive-wheels 33 and the ice will also be cut by the cutter-wheel 15.

Connected with one end of the shafts 17 and 24 is a ratchet-wheel 45, and pivotally mounted upon the frame 5 adjacent each of said ratchet-wheels is a pawl 46, which operates in connection therewith and by means whereof the said shaft may be maintained in adjusted position. A person manipulating the ice-cutting vehicle above described takes up a position upon an available part of the frame adjacent the operating-cranks 38, and, if desired, any form of seat or body-support may be employed.

By proper gearing of the shafts 36, 39, and 31 the sled may be made to attain a high rate of speed, and an ice-pond may be cut up in relatively-slight time. Moreover, the operation of marking the ice will be accomplished with considerable ease, as the power necessary for propulsion will be by no means great, the sled moving easily upon the runners 9 when once a sufficient momentum is imparted. Furthermore, the cutter-wheel 15 will be forced into the ice by the weight of the sled and occupant.

I do not desire to confine myself to the exact shape or formation of the various parts of my invention as hereinabove set forth and as shown in the drawings, nor imperatively to the precise relative arrangement of all of the same, and I reserve the right to make any and all alterations and modifications thereof as may fairly come within the scope of the invention.

Having fully described my invention, I claim as new and desire to secure by Letters Patent—

A vehicle of the class described, comprising a frame consisting of side members and cross members, said side members consisting of strips of angle-iron, the lowermost of which rests upon the ice and serves as relatively-broad runners, a pair of arms pivotally mounted in the forward portion of said frame and extending longitudinally thereof and provided at their outer ends with a revoluble cutter-wheel, another pair of arms pivotally mounted adjacent the pivotal support of said first pair of arms, a pair of drive-wheels journaled between the same, and devices for vertically adjusting said pairs of arms and for locking the same in adjusted position, a supplemental upwardly-directed frame connected with said first pair of arms, a shaft journaled therein and provided with means for turning the same, said shaft being provided with a sprocket-wheel which is connected by a sprocket-chain with a sprocket-wheel upon the shaft of said cutter-wheel, another shaft mounted in said supplemental frame and provided with a sprocket-wheel and connected with the first-mentioned shaft of said supplemental frame by means of sprocket-wheels connected with either thereof, and a sprocket-chain passed operatively about the latter sprocket-wheels and also connected with the shaft of said drive-wheels by means of sprocket-wheels and a sprocket-chain, substantially as shown and described.

In testimony that I claim the foregoing as my invention I have signed my name, in presence of the subscribing witnesses, this 10th day of October, 1899.

JAMES C. GREEN.

Witnesses:
 JOHN L. CONNET,
 MARY R. GRAY.